United States Patent Office 2,931,780
Patented Apr. 5, 1960

2,931,780
DEFOAMING COMPOSITIONS AND PROCESS

Charles S. Steiner, Homewood, Ill., Earle Fritz, East Chicago, Ind., and Jack M. Becktel, Chicago, and William H. Kloster, Naperville, Ill., assignors to Swift & Company, Chicago, Ill., a corporation of Illinois No Drawing. Application March 19, 1956
Serial No. 572,208

9 Claims. (Cl. 252—321)

This invention relates in general to the abatement or suppression of foaming, and more particularly to novel compositions and methods for suppressing foam formation in media normally tending to foam excessively.

Foam formation is undesirable in many industrial operations, particularly in the heating, evaporation or distillation of aqueous media, and as a result various means have been employed in an attempt to combat the tendency toward foaming. In fermentation processes and specifically in the manufacture of yeast or antibiotics foaming results in decreased yields. In diverse other fields, such as paper manufacture, glue manufacture, sewage purification, and cream separation, the inhibition of foam development is necessary to economical operation.

Although mechanical devices have been employed heretofore to combat foam in some instances, notably steam boiler foaming, the great majority of foaming problems have been attacked by the use of chemical methods. Many chemical antifoaming or defoaming agents have been proposed to inhibit or suppress foaming in different foaming media, and these defoamers include such materials as long chain liquid alcohols, vegetable phosphatides, silicones, and blown drying oils. While these materials exhibit a certain degree of effectiveness in some cases, they are often specific in that they prevent or diminish foaming in a particular operation and are not applicable to a wide range of foaming problems. Moreover, many of the known defoamers are effective only in such large amounts as to be uneconomical. Others are materials toxic to humans and may not be used where the final product of a given process is intended for human consumption, as with fermentation products.

It is therefore an object of this invention to provide novel defoaming compositions which are effective in suppressing foam or inhibiting the development of foam in various foamable media and which possess desirable toxicity and cost characteristics.

A further object of this invention is to provide an improved method for abating the development of foam in media which normally tend to foam excessively.

Additional objects if not specifically set forth herein will be readily apparent to one skilled in the art from the following detailed description of the invention.

In general, the present invention relates to novel defoamer compositions derived from tall oil pitch. Tall oil is a by-product obtained from the sulfate and soda digestion of wood pulp in the manufacture of paper. Crude tall oil consists of a complex mixture of rosin acids, fatty acids, and unsaponifiable materials. It is dark in color and contains various insoluble resinous components. Crude tall oil is a valuable source of fatty acids and rosin acids and may be distilled under reduced pressure to remove the fatty and rosin acids which are used in soap, paint and other industries. The residue remaining in the still after distillation of the fatty and rosin acids is a dark, rather viscous mixture in which the unsaponifiables are present in a more concentrated form than in the crude oil. This still residue is called "tall oil pitch." It is known that tall oil pitch contains phytosterols in an amount which makes isolation of the sterol component commerically feasible. Although separation of the sterol fraction has been considered difficult heretofore, there is disclosed in a copending application of C.S. Steiner and Earle Fritz, Serial No. 527,166, filed August 8, 1955, now Patent No. 2,835,682, a commercially practicable method for recovering a substantial portion of the sterols from tall oil pitch.

In accordance with the method disclosed in the aforementioned application, which is incorporated herein by reference, tall oil pitch is subjected to countercurrent fractionation with a liquid normally gaseous hydrocarbon such as propane. The fractionation is carried out at temperatures in the range of 130–220° F. and pressures in the range of 550–750 p.s.i. The volume ratio of solvent to feed is in the range of 10:1 to 30:1. Under these conditions of temperature and pressure, tall oil pitch is separated into a sterol-rich raffinate and a tarry residue containing color bodies and oxidized and polymerized products in a complex mixture. The raffinate phase, after removal of the solvent, is saponified with alcoholic alkali (approximately half of the sterol component must be freed with alkali) to liberate combined sterols which are then crystallized and filtered from the mixture. The filtrate is acidified to release the acids present and the alcohol is recovered by distillation. The alcohol-free filtrate is washed with water to remove any residual acid present and the resultant liquid product obtained, which is the active defoamer component of this invention, consists of fatty acids, rosin acids, and unsaponifiable materials. Because of the complexity of the mixture of components, the exact chemical constitution of the novel antifoaming agent has not as yet been determined. An analysis of the mixture shows that a typical defoamer derived from the overhead product contains:

| Component: | Percent by weight |
|---|---|
| Fatty acids | 20–45 |
| Rosin acids | 20–50 |
| Unsaponifiables | 15–30 |

The unsaponifiable portion contains long chain aliphatic alcohols, miscellaneous hydroxy compounds, hydrocarbons, some sterols, and miscellaneous compounds of unknown composition.

Because of the good dispersability of the defoamer it may be directly incorporated in a wide variety of foamable media. Where edibility of the defoamer is of importance, as in fermentation processes involving products to be consumed by human beings, the defoamer may safely be used. Stability against heat and retention of defoaming activity after long periods of storage are other desirable characteristics. Since the defoamer is derived from what has previously been considered a low cost byproduct, cost considerations are very favorable. The foam suppressing agent is, moreover, applicable in a wide range of foaming media and exhibits good compatibility with the active components of the medium being treated. In yeast fermentation, for example, the growth of micro-organisms appears to be unaffected by the presence of the defoamer.

Although it is within the broad contemplation of this invention to use the tall oil pitch derivative alone as a defoamer, it is advisable in practice to combine the defoaming agent with other materials, such as diluents and emulsifiers. Mineral oil is an example of an inexpensive and effective diluent although other excipient compositions, such as fatty oils and kerosene, may be employed depending upon compatibility with the media being treated. The emulsifier material may include any of the general group of partial ethers and esters of polyhydric alcoholic materials. Partial esters of glycerols, polyglycerols, glycols, polyglycols, and polyoxyethylene glycols have been found to be effective emulsifiers for the novel defoaming agent. Oleic acid monoesters of polyethylene glycol, for example, appear to profoundly enhance the defoaming properties of the defoaming agent. The following illustrative formulations have been found to provide excellent defoaming action:

| Composition | | Parts by Weight |
|---|---|---|
| A | Mineral oil | 50 |
|   | Tall oil pitch overhead derivative | 50 |
| B | Mineral oil | 47.5 |
|   | Tall oil pitch overhead derivative | 47.5 |
|   | Polyethylene glycol mono-oleate "400" | 5 |
| C | Mineral oil | 43 |
|   | Tall oil pitch overhead derivative | 43 |
|   | Sugar cane oil | 4 |
|   | Glycerol mono-oleate | 10 |
| D | Mineral oil | 45 |
|   | Tall oil pitch overhead derivative | 45 |
|   | Polyethylene glycol mono-oleate "400" | 5 |
|   | Sugar cane oil | 5 |

The following example illustrates the effectiveness of the defoamer material in a cornsteep liquor solution:

Example 1

A glass cylinder having a cylindrical carborundum air disperser at the bottom thereof is charged with 100 ml. of a 1 percent cornsteep liquor solution. Finely dispersed air is passed through the cylinder at the rate of about 1600 cc./min. The total height of the liquor plus foam is measured and compared with the height of an aspirated standard containing no defoamer. The nonfoaming liquid level is 4 inches.

| Composition | | Parts | Height Liquor and Foam (No Defoamer) | Height Liquor and Foam (1 Drop Defoamer Added) |
|---|---|---|---|---|
|   |   |   | Inches | Inches |
| A | Mineral Oil | 50 | 15 | 6.75 |
|   | Tall oil pitch overhead | 50 | | |
| B | Mineral Oil | 47.5 | 15 | 4.0 |
|   | Tall oil pitch overhead | 47.5 | | |
|   | Polyethylene glycol mono-oleate "400" | 5 | | |
| C | Mineral oil | 43 | 15 | 5.0 |
|   | Tall oil pitch overhead | 43 | | |
|   | Glycerol mono-oleate | 10 | | |
|   | Sugar cane oil | 4 | | |
| D | Mineral oil | 60 | 15 | 5.75 |
|   | Tall oil pitch overhead | 38 | | |
|   | Glycerol mono-oleate | 2 | | |

Although the novel defoamer compositions of the present invention have been found to be very effective when used in very small amounts, it should be noted that the use of the compositions in various media will require that varying amounts of the defoamer be employed. As little as 0.01 percent by weight of defoamer has been found to be effective in yeast fermentation operations. While greater amounts are also effective, the upper limitation on the amount to be added is determined by economic considerations since after a certain point the addition of more defoamer results in no significant improvement in foam suppression.

As used herein, the term "normally gaseous hydrocarbon" is intended to mean propane and butane, although other hydrocarbons of lower or higher boiling point such as $C_2$ and $C_5$ hydrocarbons may be present in commercial products.

"Tall oil pitch" is the residue from the distillation of tall oil to recover fatty acids. The pitch contains a reduced amount of fatty and rosin acids as compared to the crude oil, and also contains a greater percentage of unsaponifiables, since the unsaponifiables are concentrated by removal of the fatty and rosin acids. Also present in the pitch are oxidized and polymerized products probably formed as a result of heat applied to the still during distillation.

A particular advantage inherent in the compositions of the present invention resides in the fact that superior foam suppressing or abating compositions are obtained from what has heretofore been considered an inexpensive material. In addition, because of the edibility and wide range of effectiveness of the compositions, they are adaptable to use in a broad range of foamable media.

Obviously, many modifications and variations of the invention as hereinbefore set forth may be made without departing from the spirit and scope thereof, and therefore only such limitations should be imposed as are indicated in the appended claims.

We claim:

1. A method of suppressing foam in a media normally having the tendency to foam excessively, which comprises: incorporating in said media a small but sufficient amount of a substantially sterol-free mixture of fatty acids, rosin acids, and unsaponifiable materials, said mixture being derived from tall oil pitch by extraction of said tall oil pitch with a liquid normally gaseous hydrocarbon, and removal of the sterols.

2. A method of inhibiting the development of foam in a media normally having the tendency to foam excessively, which comprises: incorporating in said media a small but effective amount of a composition containing as an essential ingredient thereof the substantially sterol-free raffinate obtained from the solvent fractionation of tall oil pitch a liquid normally gaseous hydrocarbon, and removal of the sterols.

3. A method of inhibiting the development of foam in a media normally having the tendency to foam excessively, which comprises: incorporating in said media a small but effective amount of the complex mixture obtained as the alcoholic alkali soluble portion of the raffinate in the countercurrent extraction of tall oil pitch with a liquid normally gaseous hydrocarbon.

4. A method of suppressing foam in a media normally tending to foam excessively which comprises: incorporating in said media a small but effective amount of a substantially sterol-free tall oil pitch derivative containing from about 20 to about 45 percent fatty acids, from about 15 to about 30 percent unsaponifiables, and from about 20 to about 50 percent rosin acids, said derivative being obtained by saponification, sterol removal, and subsequent acidification of the raffinate fraction obtained by the solvent fractionation of tall oil pitch with a liquid normally gaseous hydrocarbon.

5. A defoaming composition which comprises the substantially sterol-free raffinate fraction derived from the solvent fractionation of tall oil pitch with a liquid normally gaseous hydrocarbon solvent, and removal of sterols, as an essential ingredient and an emulsifier selected from the group consisting of partial ethers and partial esters of polyhydric alcoholic materials.

6. A defoaming composition which comprises a mixture of an emulsifier selected from the group consisting of partial ethers and partial esters of polyhydric alcoholic materials and the substantially sterol-free raffinate fraction derived from the solvent fractionation of tall oil pitch with a liquid normally gaseous hydrocarbon, and removal of sterols, together with a diluent.

7. A defoaming composition obtained from the raffinate in the solvent fractionation of tall oil distillation pitch which comprises: the residue remaining after substantial removal of phytosterols by saponification, sterol removal, and subsequent acidification of the overhead fraction resulting from solvent fractionation of said pitch with a liquid normally gaseous hydrocarbon.

8. An antifoam composition containing, as essential ingredients, the substantially desterolized raffinate fraction obtained from the solvent fractionation of tall oil pitch with a liquid normally gaseous hydrocarbon solvent, and removal of sterols, and an emulsifier selected from the group consisting of partial ethers ad partial esters of polyhydric alcoholic materials, said emulsifier being present in proportions sufficient to enhance substantially the defoaming properties of said raffinate fraction.

9. A tall oil pitch composition comprising the complex mixture obtained as the alcoholic alkali soluble portion of the raffinate in the countercurrent extraction of tall oil pitch with a liquid normally gaseous hydrocarbon solvent.

References Cited in the file of this patent

UNITED STATES PATENTS

| | | |
|---|---|---|
| 2,666,017 | Moss et al. | Jan. 12, 1954 |
| 2,748,089 | Monson | May 29, 1956 |
| 2,762,780 | Kulakow | Sept. 11, 1956 |
| 2,835,682 | Steiner et al. | May 20, 1958 |

FOREIGN PATENTS

| | | |
|---|---|---|
| 513,513 | Canada | June 7, 1955 |

UNITED STATES PATENT OFFICE

CERTIFICATE OF CORRECTION

Patent No. 2,931,780         April 5, 1960

Charles S. Steiner et al.

It is hereby certified that error appears in the printed specification of the above numbered patent requiring correction and that the said Letters Patent should read as corrected below.

Column 2, line 58, for "favormable" read -- favorable --; column 3, first table, column 2, line 2 thereof, for "derviative" read -- derivative --; column 4, line 33, after "pitch" insert -- with --.

Signed and sealed this 6th day of September 1960.

(SEAL)
Attest:

ERNEST W. SWIDER         ROBERT C. WATSON
Attesting Officer          Commissioner of Patents